May 5, 1936.  C. O. SPILLMAN  2,039,746
BUTT WELD PIPE
Filed Aug. 29, 1935
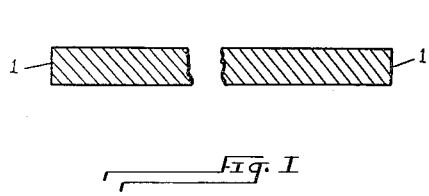
Fig. I
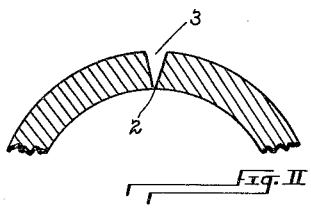
Fig. II
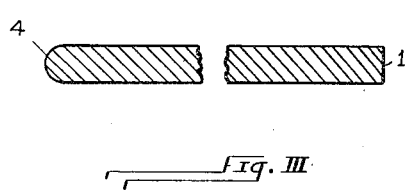
Fig. III
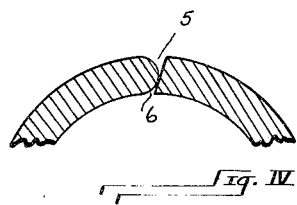
Fig. IV
INVENTOR
Charles O. Spillman
by Christy and Wharton
his attorneys Patented May 5, 1936

2,039,746

UNITED STATES PATENT OFFICE 2,039,746

BUTT-WELD PIPE

Charles O. Spillman, Beaver, Pa., assignor to Pittsburgh Tube Company, Pittsburgh, Pa., a corporation of Delaware Application August 29, 1935, Serial No. 38,414

1 Claim. (Cl. 205—12)

This invention relates to the production of butt-weld pipe, and consists in a specific shaping of the edge of the skelp, in consequence of which difficulties in the way of producing consistently a sound weld and an unblemished product are either overcome or avoided.

In the accompanying drawing Figs. I and II are fragmentary and diagrammatic views in cross-section of a piece of skelp before and after shaping to tubular form. Fig. II shows the skelp as it is shaped in the welding bell and at the instant in its progress when actual welding begins. Figs. I and II are illustrative of the prior art. Figs. III and IV are similar views of a piece of skelp that differs from the skelp of Figs. I and II in that, whereas the skelp of Figs. I and II is plane-surfaced at the edges, the skelp of Figs. III and IV is at one edge rounded. It is by virtue of this character that the skelp of Figs. III and IV is an embodiment of my invention.

Skelp is the term that designates a long narrow strip of rolled metal, ordinarily of steel, that in heated condition is drawn powerfully through a bell-mouthed die, known as the welding bell. As it advances through the bell it is gradually shaped to tubular form, its edges are brought to abutment and forced together. The conditions of temperature and pressure are such as to effect a weld union between the so abutted edges. In the welding the article becomes a pipe.

Typically, the edges of the skelp extend in planes that are perpendicular to the faces of the skelp, as shown at I, I, Fig. I. It is manifest that these edges will in the welding bell be brought initially to contact at the inner angles, as seen at 2 in Fig. II, and that the further operation consists in closing under compression the relatively widely flaring V-shaped space 3. In such case the weld is completed by crushing and displacing the metal and by widening the area of contact from an initial line at the meeting inner angles outwardly across the meeting edges. In the making of thick-walled tubing of small diameter particularly, the production of a satisfactory article is, under such conditions, difficult; the V-shaped space 3 is not always completely closed; or, if completely closed, a protrusion of metal is likely to be developed along the seam within the bore of the pipe; and neither condition is satisfactory.

It is because of such liability to defect that resort has been had to shaping the skelp with beveled edges. In consequence, the edges of the skelp when shaped in the welding bell may be brought together face to face, or approximately so; and blemishes in the welded pipe of the nature indicated above will thus be avoided. Experience, however, proves that the weld afforded by beveled-edged skelp is likely to be weak and insecure. And this defect is the more serious, in that it is latent, and is commonly discovered only by failure in service.

I have investigated and have found that weakness in pipe made from beveled-edged skelp is due to the presence of bits of scale caught between the meeting edges. In the shaping of the skelp to tubular form the more acute angles (which are the outer angles) of the beveled-edged skelp become, under the shaping stresses, somewhat attenuated; they are extended, and rendered more acute; and the edge surfaces of the skelp are rendered somewhat concave. In such concavity scale that is swept from the outer surface of the skelp finds lodgment, with the unfortunate consequence and effect indicated.

My invention is found in the convex shaping of one edge of the skelp, as indicated at 4, Figs. III and IV, leaving the opposite edge I planefaced. In the welding bell, then, the line of initial contact is intermediate the ultimate inner and outer surfaces of the pipe; instead of a single wide chasm, such as that indicated at 3 (Fig. II), there are smaller inner and outer chasms 5 and 6 (Fig. IV); less displacement of metal is involved in closing the seam; and a sounder and more certainly uniform product is obtained.

I claim as my invention:

The method herein described of forming butt-weld pipe which consists in drawing powerfully through a welding bell a heated skelp, plane-surfaced along one of the meeting edges and of convex form along the opposite edge and producing an area of weld that widens from an initial intermediate line of contact both inwardly and outwardly to the ultimate inner and outer surfaces of the pipe.

CHARLES O. SPILLMAN.